(12) United States Patent
Sri et al.

(10) Patent No.: US 10,417,643 B2
(45) Date of Patent: Sep. 17, 2019

(54) METHOD FOR PERSONALIZING CUSTOMER INTERACTION EXPERIENCES BY ROUTING TO CUSTOMER INTERACTION CHANNELS

(71) Applicant: [24]7.ai, Inc., San Jose, CA (US)

(72) Inventors: R. Mathangi Sri, Bangalore (IN); Bhupinder Singh, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 887 days.

(21) Appl. No.: 14/639,739

(22) Filed: Mar. 5, 2015

(65) Prior Publication Data

US 2015/0254675 A1    Sep. 10, 2015

(30) Foreign Application Priority Data

Mar. 5, 2014   (IN) ............ 1124/CHE/2014

(51) Int. Cl.
*G06Q 30/02* (2012.01)
*G06Q 30/00* (2012.01)

(52) U.S. Cl.
CPC ........... *G06Q 30/016* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,029,195 A * | 2/2000 | Herz | G06Q 30/02 725/116 |
| 6,904,408 B1 * | 6/2005 | McCarthy | A61B 5/6815 705/2 |
| 7,023,979 B1 * | 4/2006 | Wu | H04M 3/5233 379/265.11 |
| 7,353,182 B1 * | 4/2008 | Missinhoun | G06Q 10/0631 705/7.12 |
| 2004/0199923 A1 * | 10/2004 | Russek | G06F 17/30265 719/310 |

(Continued)

OTHER PUBLICATIONS

Bosnjak, Michael, Mirta Galesic, and Tracy Tuten. "Personality determinants of online shopping: Explaining online purchase intentions using a hierarchical approach." Journal of Business Research 60.6 (2007): 597-605. (Year: 2007).*

*Primary Examiner* — Marissa Thein
*Assistant Examiner* — Michelle T Kringen
(74) *Attorney, Agent, or Firm* — Perkins Coie LLP; Alberto Araiza

(57) ABSTRACT

A computer-implemented method and an apparatus for personalizing customer interaction experiences receives an input corresponding to at least one of a business objective and a customer interaction channel. A customer classification framework is selected based on the input. The customer classification framework is associated with a plurality of persona types, where each persona type is associated with a set of behavioral traits. A persona type for a customer is predicted from among the plurality of persona types during an interaction on the customer interaction channel. A propensity of the customer to perform at least one action is predicted based on the persona type. A provisioning of personalized interaction experience to the customer is facilitated based on the predicted propensity of the customer to perform the at least one action.

12 Claims, 5 Drawing Sheets

(56) References Cited

U.S. PATENT DOCUMENTS

2009/0190741 A1* 7/2009 O'Connor .............. G06Q 10/06
379/265.09
2011/0173077 A1 7/2011 Patel et al.
2012/0284080 A1* 11/2012 De Oliveira ........... G06Q 10/04
705/7.29
2013/0282430 A1* 10/2013 Kannan .................. G06Q 30/02
705/7.29

* cited by examiner

METHOD FOR PERSONALIZING CUSTOMER INTERACTION EXPERIENCES BY ROUTING TO CUSTOMER INTERACTION CHANNELS

CROSS REFERENCE TO RELATED APPLICATIONS

This application claims the benefit of Indian Provisional Patent Application No. 1124/CHE/2014, filed in the Indian Patent Office on Mar. 5, 2014, which is incorporated herein in its entirety by this reference thereto.

TECHNICAL FIELD

The present invention relates to customer relation management. More particularly, the invention relates to a method and apparatus for personalizing customer interaction experiences.

BACKGROUND

Enterprises, nowadays, offer a multitude of interaction channels to existing/potential customers (hereinafter referred to as 'customers') for facilitating customer interactions. For example, the enterprises provide a website or a web portal, i.e. a web channel, to enable the customers to locate products/services of interest, to receive information about the products/services, to make payments, to lodge complaints, and the like. In another illustrative example, the enterprises may offer dedicated customer sales and service representatives, such as for example live agents, to interact with the customers by engaging in voice conversations, i.e. speech channel, and/or chat conversations, i.e. chat channel. Similarly, the enterprises may offer other interaction channels such as an interactive voice response (IVR) channel, a social channel, and the like.

The enterprises, typically, seek to predict the intention of each customer accessing the interaction channels because prediction of the customer's intentions enables the enterprises to make suitable recommendations to the customers and thus enhance a customer service experience and/or improve the chances of making a sale. To predict intentions of customers accurately, data is collated corresponding to the customers and their interactions such as for example, data related to website surfing patterns, recent transactions, customer interests and preferences, past interaction with agents and the like. The collated data is used for profiling of customers into different user profiles based on certain commonality in their attributes. Appropriate business rules and/or predictive models are then used to predict intentions of customers, such as for example, intention to purchase a product and/or avail a service and the like. However, such profiling of customers based on certain commonality in their attributes may not necessarily reflect behavioral similarity, or similarity in goals and motives of the customers within the same profile. Accordingly, it would be advantageous to take customer behavioral attributes into account to provide personalized treatment to a customer.

SUMMARY

In an embodiment of the invention, a computer-implemented method receives, by a processor, an input corresponding to at least one of a business objective and a customer interaction channel. The method selects, by the processor, a customer classification framework from among a plurality of customer classification frameworks based on the input. The customer classification framework is associated with a plurality of persona types, where each persona type from among the plurality of persona types is associated with a set of behavioral traits. The method predicts, by the processor, a persona type for a customer during an interaction on the customer interaction channel, where the persona type is predicted from among the plurality of persona types. A propensity of the customer to perform at least one action is predicted by the processor based on the persona type. The method facilitates, by the processor, a provisioning of personalized interaction experience to the customer based on the predicted propensity of the customer to perform the at least one action.

In another embodiment of the invention, an apparatus for personalizing customer interaction experiences comprises at least one processor and a memory. The memory stores machine executable instructions therein, that when executed by the at least one processor, cause the apparatus to receive an input corresponding to at least one of a business objective and a customer interaction channel. The apparatus selects a customer classification framework from among a plurality of customer classification frameworks based on the input. The customer classification framework is associated with a plurality of persona types, where each persona type from among the plurality of persona types is associated with a set of behavioral traits. The apparatus predicts a persona type for a customer during an interaction on the customer interaction channel, where the persona type is predicted from among the plurality of persona types. The apparatus predicts a propensity of the customer to perform at least one action based on the persona type. The apparatus facilitates a provisioning of personalized interaction experience to the customer based on the predicted propensity of the customer to perform the at least one action.

In another embodiment of the invention, a non-transitory computer-readable medium storing a set of instructions that when executed cause a computer to perform a method for personalizing customer interaction experiences is disclosed. The method executed by the computer receives an input corresponding to at least one of a business objective and a customer interaction channel. The method selects a customer classification framework from among a plurality of customer classification frameworks based on the input. The customer classification framework is associated with a plurality of persona types, where each persona type from among the plurality of persona types is associated with a set of behavioral traits. The method predicts a persona type for a customer during an interaction on the customer interaction channel, where the persona type is predicted from among the plurality of persona types. A propensity of the customer to perform at least one action is predicted based on the persona type. The method facilitates a provisioning of personalized interaction experience to the customer based on the predicted propensity of the customer to perform the at least one action.

DETAILED DESCRIPTION

Figure 1:
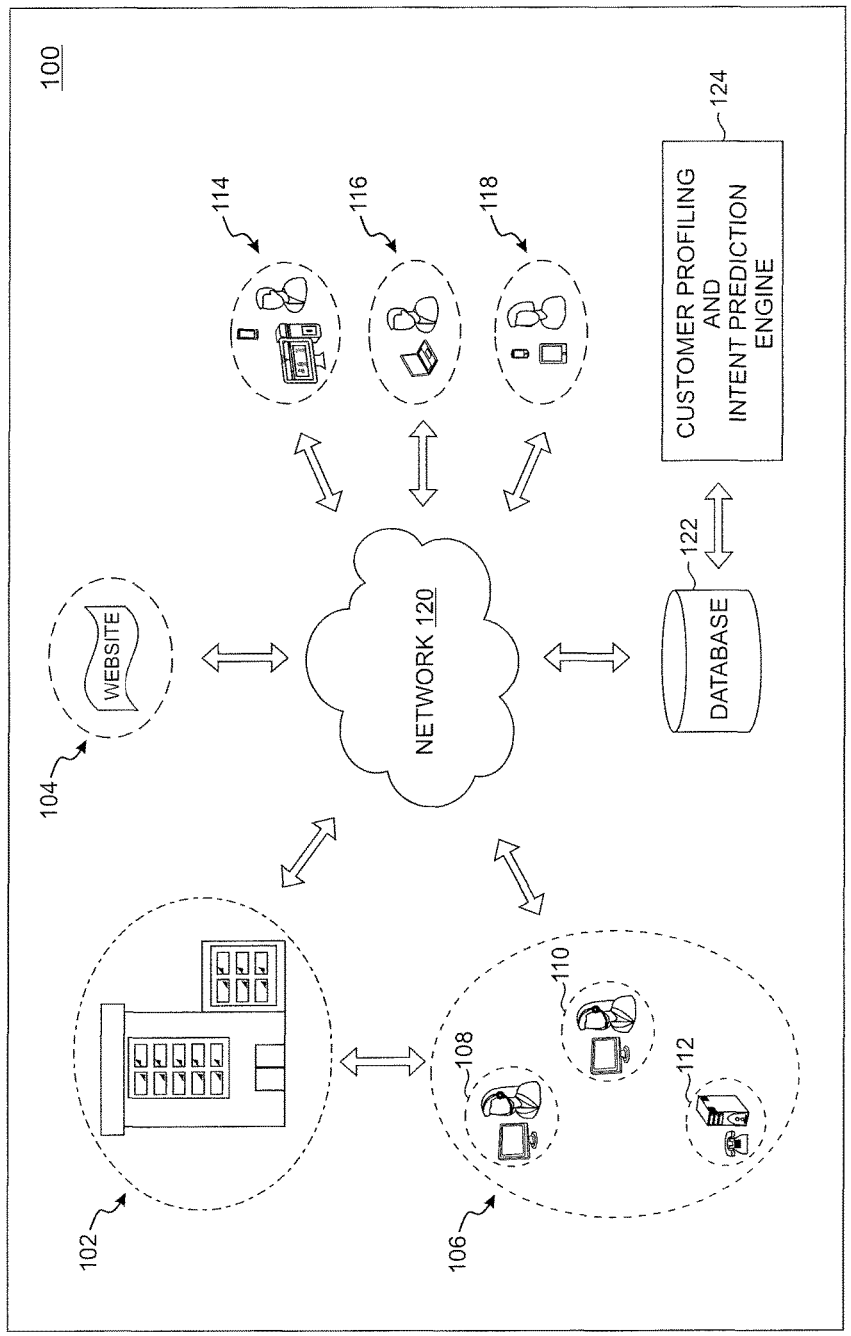
FIG. 1 is a schematic diagram showing an illustrative environment in accordance with an example scenario.

FIG. 1 is a schematic diagram showing an illustrative environment 100 in accordance with an example scenario. The environment 100 depicts an example enterprise 102. Though the enterprise 102 is exemplarily depicted to be a firm, it is understood that the enterprise 102 may be any large or small entity (for example, a corporation, a small business such as a shop or a store outlet, or even a brick and mortar entity) offering products and/or services to existing and prospective users (referred to herein as customers). The enterprises, such as the enterprise 102, offer multiple interaction channels to customers for facilitating customer interactions. For example, enterprises provide a website or a web portal, i.e. a web channel, to enable the customers to locate products/services of interest, to receive information about the products/services, to make payments, to lodge complaints, and the like. In another illustrative example, enterprises offer virtual agents to interact with the customers and enable self-service. In another illustrative example, the enterprises offer dedicated customer sales and service representatives, such as live agents, to interact with the customers by engaging in voice conversations, i.e. speech channel, and/or chat conversations, i.e. chat channel. Similarly, the enterprises offer other interaction channels such as an interactive voice response (IVR) channel, a social channel, and the like. In the environment 100, the enterprise 102 is depicted to be associated with a website 104 (or a web portal) and a dedicated customer support facility 106 including human resources and machine-based resources for facilitating customer interactions. The customer support facility 106 is exemplarily depicted to include two live agents 108 and 110 (who provide customers with voice-based assistance and chat-based/online assistance, respectively) and an automated voice response system, such as IVR system 112. It is understood that the customer support facility 106 may also include automated chat agents such as chat bots, and other web or digital self-assist mechanisms. Moreover, it is noted that customer support facility 106 is depicted to include only two live agents 108 and 110 and the IVR system 112 for illustration purposes and it is understood that the customer support facility 106 may include fewer or more number of resources than those depicted in FIG. 1.

The environment 100 further depicts a plurality of customers, such as a customer 114, a customer 116 and a customer 118. It is noted that the term 'customers' as used herein includes both existing customers as well as potential customers of information, products and services offered by the enterprise 102. Further, it is understood that three customers are depicted herein for example purposes and that the enterprise 102 may be associated with many such customers. In some example scenarios, the customers 114, 116 and 118 may interact with the website 104 and/or the resources deployed at the customer support facility 106 over a network 120 using their respective electronic devices. Examples of such electronic devices may include mobile phones, Smartphones, laptops, personal computers, tablet computers, personal digital assistants, Smart watches, web-enabled wearable devices and the like. Examples of the network 120 may include wired networks, wireless networks or a combination thereof. Examples of wired networks may include Ethernet, local area network (LAN), fiber-optic cable network and the like. Examples of wireless network may include cellular networks like GSM/3G/4G/CDMA based networks, wireless LAN, Bluetooth or Zigbee networks and the like. An example of a combination of wired and wireless networks may include the Internet.

As explained above, customer interactions with the enterprise 102 are carried out over multiple interaction channels. The enterprises, such as the enterprise 102, typically, seek to predict the intention of each customer accessing the interaction channels because the prediction of the customer's intentions enables the enterprises to make suitable recommendations to the customers and thus enhance a customer service experience and/or improve chances of making a sale. To predict intentions of customers accurately, the enterprises collate data corresponding to the customers and their interactions in a database, such as the database 122 depicted in FIG. 1. The collated data may include, but is not limited to, data related to website surfing patterns, recent transactions, customer interests and preferences, past interaction with agents and the like.

In an example scenario, the collated data is provisioned to customer profiling and intent prediction engine 124 (hereinafter referred to as 'profiling and prediction engine' 124) which is configured to mine data corresponding to the customers and their interactions to segregate customers into different user profiles based on certain commonality in their attributes. Appropriate business rules and/or predictive models are then used to predict intentions of customers, such as for example, intention to purchase a product and/or avail a service and the like. However, such profiling of customers based on certain commonality in their attributes may not necessarily reflect behavioral similarity, or similarity in goals and motives of customers within the same profile. For example, customers may be profiled based on age, gender, socio-economic status, profession and the like. However, even though customers within a shared user profile may share common attributes, they may exhibit markedly different behavior as consumers of products/services. For example, one middle-aged male may prefer shopping online for convenience purposes, whereas another middle-aged male may prefer to purchase goods/services in physical stores on account of a personal preference to visually see and touch/feel the product. Similarly, an individual may prefer to perform transactions over a web channel, whereas another individual may prefer to speak with an agent, i.e. use the speech channel, prior to making the purchase. Mechanisms, such as the profiling and prediction engine 124, are rendered inadequate for the purpose of taking customer behavioral attributes into account to provide personalized treatment to a customer. Various embodiments of the present invention provide systems and methods that are capable of overcoming these and other obstacles and providing additional benefits. More specifically, methods and apparatuses disclosed herein suggest segmenting a customer base by key behavioral traits or personas (also referred to as 'persona types' herein) to identify groups that behave similarly and to personalize treatment to these groups during interactions over various interaction channels. An apparatus configured to facilitate personalization of interaction experiences based on customer personas is explained with reference to FIG. 2.

Figure 2:
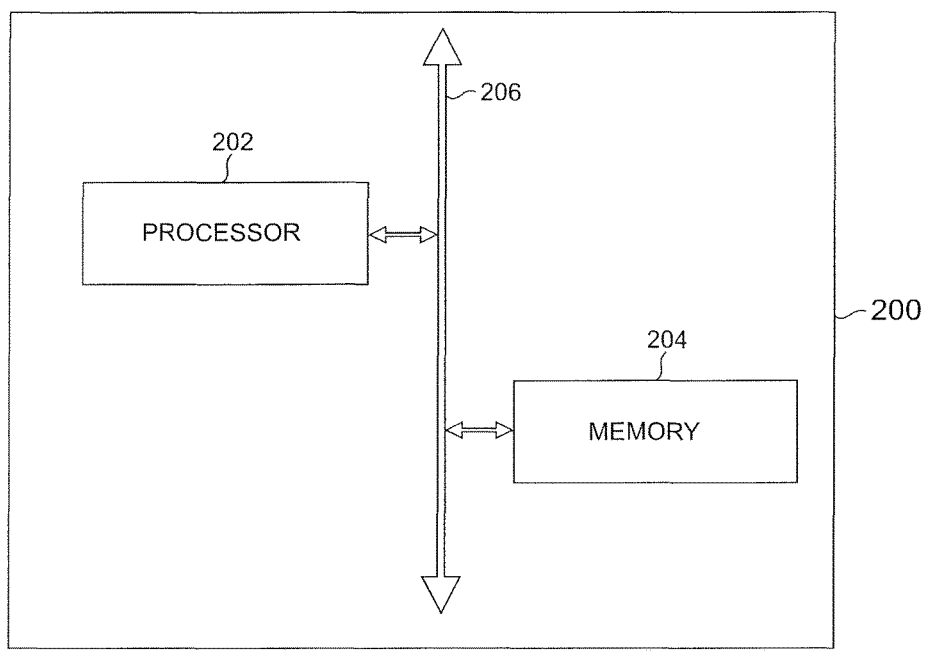
FIG. 2 is a block diagram of an example apparatus in accordance with an embodiment of the invention.

FIG. 2 is a block diagram of an example apparatus 200 in accordance with an embodiment of the invention. In an embodiment, the apparatus 200 may be deployed in a web server. In another embodiment, the apparatus 200 may be a standalone component in a remote machine connected to a communication network (such as the network 120 explained with reference to FIG. 1) and capable of executing a set of instructions (sequential and/or otherwise) so as to personalize customer interaction experiences. In an embodiment, the apparatus 200 may be communicably associated with one or more enterprise web portals/websites, such as the website 104 of FIG. 1, and the customer support center, such as the customer support facility 106 associated with the enterprise 102, to receive interaction data related to customer interactions on a plurality of customer interaction channels in real-time and in an on-going manner.

The apparatus 200 includes at least one processor, such as a processor 202 and a memory 204. It is noted that though the apparatus 200 is depicted to include only one processor, the apparatus 200 may include more number of processors therein. In an embodiment, the processor 202 and the memory 204 are configured to communicate with each other via or through a bus 206. Examples of the bus 206 may include, but are not limited to, a data bus, an address bus, a control bus, and the like. The bus 206 may be, for example, a serial bus, a bi-directional bus or a unidirectional bus. In an embodiment, the bus 206 may be embodied as a centralized circuit system.

In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed. The processor 202 may include, among other things, a clock, an arithmetic logic unit (ALU) and logic gates configured to support an operation of the processor 202. The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

In an embodiment, the processor 202 is configured to, with the content of the memory 204, cause the apparatus 200 to receive an input corresponding to a business objective. A business objective, as seen from a perspective of an enterprise such as the enterprise 102 depicted in FIG. 1, may vary from one scenario to another. For example, a business objective in a customer service scenario may be to achieve higher level of customer satisfaction, to reduce operational cost, to quickly resolve customer queries and the like. In another illustrative example, a business objective in a customer sales scenario may be to drive higher revenue, higher conversion volumes and the like.

In an embodiment, the apparatus 200 is further configured to receive an input corresponding to a customer interaction channel. As explained with reference to FIG. 1, enterprises offer a multitude of customer interaction channels, such as a web channel, a chat channel, a speech channel, an IVR channel, a social channel, a native application channel and the like, to customers for facilitating customer interactions. A customer interaction channel is hereinafter referred to as an interaction channel. The apparatus 200 may be configured to receive an input identifying an interaction channel from among the plurality of interaction channels. The identified interaction channel may correspond to a medium of on-going customer interaction. For example, if the customer is currently browsing a web portal associated with an enterprise, then the interaction channel may be identified as web channel. Similarly, if the customer is interacting with an IVR system at a customer support center, then the interaction channel may be identified as the IVR channel. In an embodiment, the identified interaction channel may correspond to an interaction channel predicted to be selected by the customer in near future for interaction purposes. In an illustrative example, the apparatus 200 may be configured to predict that the customer would be accessing social channel within the next hour. Accordingly, the interaction channel may be identified to be the social channel. In another embodiment, the identified interaction channel may correspond to an interaction channel determined to be most appropriate by the apparatus 200 for proactively reaching out to the customer.

In an embodiment, the apparatus 200 is configured to receive at least one input corresponding to the business objective and the interaction channel. In an embodiment, the processor 202 is configured to, with the content of the memory 204, cause the apparatus 200 to select a customer classification framework from among a plurality of customer classification frameworks based on the input. More specifically, the apparatus 200 is configured to select a customer classification framework based on the input of at least one of the business objective and the customer interaction channel. In an embodiment, the apparatus 200 may be configured to identify a number of customer classification frameworks or taxonomies based on review of literature, such as for example behavioral studies, surveys and the like. The identified customer classification frameworks may be capable of facilitating segregating customers based on customer personas types. The term 'persona' as will be used herein refers to characteristics reflecting behavioral patterns, goals, motives and personal values of the customer. It is noted that 'personas' as used herein is distinct from the concept of user profiles, that are classically used in various kinds of analytics, where similar groups of customers are identified based on certain commonality in their attributes, which may not necessarily reflect behavioral similarity, or similarity in goals and motives. The identification of commonality in behavioral traits or personas of customers may facilitate in personalizing interactions between customers and customer service representatives as will be explained hereinafter.

To segregate customers based on personas, each customer classification framework is associated with a plurality of persona types, where each persona type is associated with a set of behavioral traits. In an embodiment, a behavioral trait from among the set of behavioral traits corresponds to one of a customer biological characteristic, a customer sociological characteristic and a customer psychological characteristic. An example of a psychological characteristic may be a degree of decidedness associated with a customer while making a purchase. For example, some customers dither for a long time and check out various options multiple times before making a purchase, whereas some customers are more decided in their purchasing options. An example of a sociological characteristic may correspond to a likelihood measure of a customer to socialize a negative sentiment or an experience. For example, a customer upon having a bad experience with a product purchase may share his/her experience on social networks and/or complain bitterly on public forums, whereas another customer may choose to return the product and opt for another product, while precluding socializing his/her experience. An example of a biological characteristic may correspond to gender or even age-based inclination towards consumption of products/services or information. For example, a middle aged female may be more likely to purchase a facial product associated with ageing, whereas a middle aged man may be more likely to purchase a hair care related product. It is understood that examples of customer biological, sociological and psychological characteristics are provided herein for illustrative purposes and may not be considered limiting the scope of set of behavioral traits associated with a persona type and that each person type may include one or more such customer behavioral traits.

In an embodiment, the apparatus 200 is configured to choose/select an appropriate customer classification framework or taxonomy of persona types based on (1) business objective and/or (2) interaction channel associated with customer interaction. For example, for the business metric representative of 'brand reputation' or 'brand value' and a business objective of containment of erosion of brand reputation on social media, a customer classification framework of persona types is a set comprising: meek customers (for example, customers not likely to complain), aggressive customers (for example, customer likely to complain bitterly regarding an experience, product, brand and the like), intellectual customers (for example, customers likely to engage in intellectual discussions for a brand or a product), opportunist customers (for example, customers likely to complain if not offered a discount), chronic customer (for example, customers that are likely to repeatedly complain for any or selected products, services, brands etc.) and the like.

In another illustrative example, in a sales-based scenario, with a business objective of increasing revenues, a customer classification framework of persona types is a set comprising: a researcher (for example, a customer who is likely to thoroughly investigate alternative products before making a purchase and read and compare product specifications), a loyal customer (for example, a customer with a strong affinity to a single or a selected few brands or products or services), a convenience customer (for example, a customer who is decided on what he/she wants and who is wanting to make a purchase quickly), a compulsive buyer (for example, a customer who has high propensity to buy products he/she might not have a need for and who is very likely to agree to an up-sell/cross-sell offer made by an agent), a deal seeker (for example, a customer who is seeking motivation to get the best available deal or discount for a product or purchase), a stump (for example, a customer who is convinced against making a purchase and is very unlikely to make a purchase regardless of the quality or timeliness of customer service), and the like. The frameworks may further include any other such taxonomies of persona types, including but not limited to Myer Briggs Types Indicator (MBTI), digital personas, social character or influence, stage or decidedness of purchase, moods (angry, depressed, surprised, sarcastic, unhappy, polite, etc.), propensity to commit fraud, digital proficiency, technical proficiency, linguistic proficiency, linguistic affinity, product or subscription plan attribute affinity, media content affinity (movies, sports, music, religious, etc.), any other combination of personality traits including, but not limited to extroversion, introversion, sensing, intuition, thinking, feeling, judging, perceiving, dominance, conscientiousness, ethnocentricism, compulsiveness, dogmatism, consumer innovativeness, openness, expressiveness, attention span, responsiveness, initiation, avoidance, restlessness, frustration, loyalty, and the like.

In an embodiment, the processor 202 is configured to, with the content of the memory 204, cause the apparatus 200 to predict a persona type from among the plurality of persona types for a customer during an interaction on the interaction channel. As explained above, an appropriate customer classification framework from among the plurality of customer classification frameworks may be identified based on the input of at least one of the business objective and the interaction channel. The apparatus 200 is configured to utilize the plurality of persona types associated with the identified customer classification framework for predicting the persona type of the customer. In an embodiment, the persona type is predicted based on behavioral traits exhibited by the customer during the interaction. In an embodiment, the persona type is predicted based on behavioral traits mentioned by the customer during the interaction or behavioral traits inferred during the interaction. In yet another embodiment, the persona type is predicted based on past interaction history associated with the customer, where the past interaction history is indicative of behavioral traits corresponding to the customer.

As explained with reference to FIG. 1, customers may interact with an enterprise over multiple interaction channels. The information related to the customer activity on the interaction channels may be collated and stored in the memory 204 as interaction data. For example, the customer may access a website corresponding to an enterprise for locating content of interest. Accordingly, information related to customer activity on the website, such as sequence of web pages visited, menus accessed on one or more web pages, time spent on the web pages and such other information related to the customer's web journey may be stored as interaction data. In another illustrative example, if the customer has contacted a customer service center associated with the enterprise and interacted with an IVR system, then the customer's intention (referred to as 'intent' hereinafter) for contacting the IVR system, the IVR options selected by the customer, whether the customer's concern was resolved or not and such other information related to customer activity on the IVR channel may be stored as interaction data. It is understood that interaction data may further include data collated from customer activity on other interaction channels, such as a speech channel, a chat channel, a social channel, a native mobile application channel, an enterprise branch channel (for example, customer's visit to a physical store) and the like.

In addition to the interaction data, the memory 204 is configured to store profile information corresponding to the customer. The stored profile information may include customer's name, contact details, personal and family information, financial information, information relating to products and services associated with the customer, social media account information, other related messaging or sharing platforms and the like. The customer information may further include information related to customer interests and preferences, recent transactions and the like. In some exemplary embodiments, the customer information may also include calendar information associated with the customer. For example, the calendar information may include information related to an availability of the customer during the duration of the day/week/month. The apparatus 200 is configured to analyze the interaction data and the profile information to identify behavioral traits associated with the customer during various interaction scenarios and accordingly persona type associated with the customer. Accordingly, the behavioral traits exhibited, mentioned, inferred or predicted based on past interaction history may be compared with sets of behavioral traits associated with the plurality of persona types in the identified customer classification framework to identify a presence of a match. The matching persona type may be predicted as the persona type of the customer.

In an embodiment, the processor 202 is configured to, with the content of the memory 204, cause the apparatus 200 to predict a propensity of the customer to perform at least one action based on the persona type. In an embodiment, the propensity of the customer to perform the at least one action is predicted based on the persona type as well as the collated interaction data and the profile information stored corresponding to the customer in the memory 204. In an embodiment, an action may correspond to purchasing a product, interacting with an agent over one or more interaction channels, and socializing at least one of a product, a purchase, a good sentiment, a bad sentiment, a brand, an experience and a feeling. In an example scenario, the apparatus 200 is configured to predict a social influence co-efficient associated with a customer, which is indicative of degree of influence a customer can exert on his/her social network. The apparatus 200 may utilize various known social network analysis techniques (for example, number of people following the customer, or, centrality of node connections in a graphical node based depiction of network connections, etc.) to predict the customer's social influence co-efficient. Such a prediction of the social influence coefficient may be utilized in predicting the propensity of the customer to perform an action, such as socializing at least one of a product, a purchase, a good sentiment, a bad sentiment, a brand, an experience and a feeling. In some example embodiments, the apparatus 200 is further configured to utilize the predicted persona type of a customer to predict the propensity to accept a cross-sell or an up-sell offer by an agent or to predict the products that a persona type is most likely to purchase or to predict the product attributes that a persona type has the highest affinity to, and the like. The apparatus 200 may be configured to use prediction models for predicting propensity of the customer to perform at least one such action. Examples of the prediction models may include models based on supervised or unsupervised algorithms such as, but are not limited to, K-means clustering, hierarchical clustering, support vector machines, K nearest neighbor (KNN), Naïve Bayesian, Rule Engines, Neural Networks, logistic regression, decision trees, random forest, ensemble models, etc. More specifically, the prediction models may be configured to extract certain features from the customer interactions or from the agent interactions or from both customer and agent interactions. Further, the prediction models may be configured to extract features by utilizing a relationship between the customer and agent interactions (for example, sentiment of the customer for a given agent response). Examples of the features that may be fed into the prediction models may include, but are not limited to, any combinations of words features such as n-grams, unigrams, bigrams and trigrams, word phrases, part-of-speech of words, sentiment of words, sentiment of sentences, position of words, customer keyword searches, customer click data, customer web journeys, the customer interaction history and the like. In an embodiment, the prediction models may utilize any combination of the above-mentioned input features along with the data such as, but not limited to, which agent handled the dialogue, what the outcome was, interaction transfers if any and the like to predict the propensity of the customer to perform at least one action on the interaction channel.

In an embodiment, the processor 202 is configured to, with the content of the memory 204, cause the apparatus 200 to facilitate a provisioning of personalized interaction experience to the customer based on the predicted propensity of the customer to perform the at least one action. In order to facilitate the provisioning of the personalized interaction experience to the customer, in one embodiment, the apparatus 200 is configured to associate one or more value traits with the persona type predicted for the customer. In an embodiment, each value trait from among the one or more value traits corresponds to an attribute characterizing a nature of the interaction, where the attribute is deemed to be of value (for example, of importance or liking) to the persona type. More specifically, the predicted persona type is further associated with most appropriate set of attributes that a persona type is most likely to value or appreciate. The one or more value traits may be collated from surveys, behavioral studies, design of experiments, explicitly mentioned by customers in their interactions, inferred or predicted from interaction history. For example, consider a persona type 'convenience customer' that corresponds to a group of customers characterized by the behavioral trait that they are focused and are looking for expeditious delivery of service. Such a persona type would value attributes like knowledge, focus & speed or terseness from a customer care representative, they are interacting with, in order to accomplish their goal. Therefore, the apparatus 200 is configured to associate the persona type 'convenience customer' with value traits 'knowledge, focus & speed'. It is noted that such an association may be configured to be customizable in the apparatus 200. In an example embodiment, such an association of the value traits to a persona type may further be made based on customer surveys, agent surveys, association mining, predictive models on structured and unstructured chat data, design of experiments, etc. In an embodiment, the apparatus 200 is further configured to generate one or more recommendations based on the predicted propensity to perform the at least one action for facilitating a provisioning of the personalized interaction experience to the customer. In an embodiment, the one or more recommendations are generated such that the business objective is achieved during the interaction and/or recommendations are suited to satisfy the one or more value traits associated with the persona type.

In an embodiment, the processor 202 is configured to, with the content of the memory 204, cause the apparatus 200 to identify an affinity of the persona type to one or more interaction channels from among a plurality of interaction channels. In an embodiment, the apparatus 200 is further configured to determine if the interaction channel associated with the on-going interaction is one among the one or more interaction channels associated with the persona type affinity. Furthermore, the apparatus 200 is configured to provision personalized interaction experience to the customer by routing the interaction to the one or more interaction channels associated with affinity if the interaction channel associated with the current interaction is determined to be not among the one or more interaction channels. In an illustrative example, if it is determined that for the persona type 'loyal customer' predicted for the customer, the on-going interaction is being conducted on a chat channel, whereas the speech channel is preferred by the persona type, then in such a scenario, the apparatus 200 is configured to route the interaction to the speech channel in order to personalize the interaction. Such personalization of the customer interaction is explained in further detail later with reference to FIG. 3.

As explained with reference to FIG. 1, a customer interaction in some example scenarios may correspond to one of a voice-based interaction and a chat-based interaction between the customer and an agent (also referred to as an 'customer support representative' herein). Further, the interaction may be initiated by the customer or proactively initiated by the agent. Further, the interactions may be related to resolving queries of the customer regarding sales or service, for advertising, for containing negative sentiments over social media, for addressing grievances of the customer, for escalation of customer service issues, for enquiring about upgrades, for enquiring about billing or payment or shipping of the product/service, for providing feedback, for requesting feedback, for registering a complaint or to follow up about a previous query and the like. In an embodiment, the one or more recommendations are provided to customer or to the agent during the interaction for facilitating provisioning of the personalized interaction experience to the customer.

In an embodiment, the processor 202 is configured to, with the content of the memory 204, cause the apparatus 200 to predict agent persona types for a plurality of agents. In an embodiment, the prediction of the agent persona types may be performed in a similar manner as explained with reference to prediction of the persona type for the customer. More specifically, behavioral traits exhibited, mentioned, inferred or predicted from past interaction history of agents may be compared with the plurality of persona types associated with the selected customer classification framework to predict the agent persona types. In an embodiment, the apparatus 200 is configured to identify an agent from among the plurality of agents with an agent persona type most suitable to conducting the interaction with the customer associated with the predicted persona type. The apparatus 200 is further configured to route the interaction to the agent with the matching persona type to provision the personalized interaction experience to the customer. The routing of the interaction to the agent with most suitable persona type is further explained with reference to following illustrative example: In an example scenario, a customer persona type may be predicted to be 'naïve' (for example, a customer who requires assistance at each stage of interaction). Conventionally, it has been observed that if such a customer is asked a lot of probing questions then there is higher chance of making a sale to the customer. Accordingly, an agent with a persona type associated with loquaciousness (or more specifically, a verbose agent) may be identified to be most suitable to interact with the customer associated with naïve persona type. In another illustrative example, if the persona type of the customer is predicted to be a chronic complainer, then an agent most suitable to appease such a customer may be identified from among the plurality of agents and the interaction routed to such an agent to provide personalized treatment to the customer. In some example scenarios, the apparatus 200 may also be configured to provide information related to predicted persona type of the customer to an agent and request the agent to adapt his/her persona type to conduct the interaction to enhance a customer service experience and/or improve the chances of making a sale.

In an embodiment, the apparatus 200 is configured to provision a self-selection option to at least one of the customer and the agent for selecting one or more persona types from among the plurality of persona types. More specifically, the apparatus 200 is configured to predict multiple persona types and display them as options to the customer and/or the agent on their respective device display screens. For example, the apparatus 200 may be configured to predict multiple persona types and display options such as a 'technology geek' (for example, customers likely to be impressed with technological innovations/improvements in a product/service), 'brand X devotee' (for example customers loyal to a particular brand X), 'design enthusiast' (for example, customers likely to prioritize the look and feel of the product over its features), 'budget conscious' (for example, customers likely to make a purchase decision based solely on price) and the like, to a customer on the customer device's display screen. A customer may select a persona type that he/she thinks most likely resembles their purchasing characteristics from among the displayed options. Based on the selected persona type by the customer and/or the agent, the apparatus 200 may be configured to predict propensity to perform at least one action during an interaction and accordingly facilitate provisioning of the personalized interaction experience to the customer as explained above. In an embodiment, the apparatus 200 is also configured to facilitate a learning of prediction models associated with predicting the persona type of the customer or the agent based on the self-selection. More specifically, as explained above, the apparatus 200 is configured with the ability to allow the customer or the agent to explicitly mention or select from a set of persona types presented to them. The apparatus 200 has further the capability to learn from the selection of persona type, and re-train the predictive models in real-time or in an offline manner.

In an embodiment, the apparatus 200 is configured to predict the most appropriate method of personalization based on data driven approaches such as, modeling or performing design of experiments. Some examples of such methods of personalization in addition to routing a chat conversation to an agent with the best matching persona type and deflection to a different interaction channel and/or agent, may include but are not limited to sending a self serve link, sharing a knowledge base article, providing resolution to customer query over an appropriate interaction channel, escalation or suggestion of escalation of customer service level, offering a discount to the customer, recommending products to the customer for up-sell/cross-sell, suggesting products to up-sell/cross-sell to the agent as a recommendation, offering a suggestion for a discount to the agent as a recommendation, recommending a style of conversation to the agent during an interaction, presenting a different set of productivity or visual widgets to the agent to facilitate personalization of interaction with specific persona types on the agent interaction platform, presenting a different set of productivity or visual widgets to the customers with specific persona types on the customer interaction platform, proactive interaction, customizing the speed of interaction, customizing the speed of servicing information and the like. In an embodiment, design of experiments may be carried out on the selection of appropriate interaction channel, the framework of persona types, selection of best channel of interaction, the format and content of personalization, presentation of personalization to the agent or the customer and the like.

In an embodiment, the apparatus 200 is configured to determine a confidence level associated with the prediction of the persona type of the customer. Further, the apparatus 200 is configured to adapt a degree of personalization related to the personalized interaction experience to be provided to the customer based on the determination of the confidence level. More specifically, the apparatus 200 is configured to switch on or off certain personalization features, such as those explained with reference to methods of personalization above, based on the confidence level associated with the prediction of the persona type of the customer. In an embodiment, the confidence level may be embodied as a probability based value. For example, the persona type of the customer may be predicted to be a 'convenience customer' with 60% probability. In an embodiment, the apparatus 200 may be configured to define a threshold value, which may determine the degree of personalization to be provided to the customer. For example, the apparatus 200 may set a threshold value of 75% or 0.75. If the confidence level of a prediction of the persona type is greater than or equal to 0.75 then the customer may be offered any or all methods of personalization. However, if the confidence level of a prediction of the persona type is less than 0.75, then one or more personalization features, such as for example, routing of interaction from one interaction channel to another, or matching of persona type to agent persona type and the like may be switched off (or more specifically, not provided to the customer).

In an embodiment, the apparatus 200 is configured to generate and maintain a personalization model for customer interactions associated with a first language. The apparatus 200 is configured to maintain a record of personalized interaction experiences provided in a particular language to a plurality of customers based on their predicted persona types in the memory 204. Based on the maintained record of personalized interaction experiences, the apparatus 200 is configured to generate a personalization model. For example, the apparatus 200 is configured to generate a personalization model based on personalized interaction experiences provided in English language to a plurality of customers. The personalization model may serve as reference, linking persona types to methods of personalization such that the apparatus 200 may utilize the personalization model for provisioning personalized interaction experiences to the plurality of customers interacting in the English language. In an embodiment, the apparatus 200 is further configured to provision personalized interaction experiences to one or more customers interacting in a second language based on the personalization model. For example, if the apparatus 200 has generated and maintained a personalization model based on English language, i.e. the first language, then in some example scenarios, the apparatus 200 is configured to provide personalized interaction experience to customers interacting in say, German language, i.e. the second language, based on the personalization model.

In an embodiment, the apparatus 200 is configured to generate and maintain a multi-lingual personalization model for personalizing customer interactions across a plurality of languages. More specifically, the apparatus 200 is configured to maintain a record of personalized interaction experiences provided in a plurality of languages, such as for example, in English, French, Spanish, German and the like, to a plurality of customers based on their predicted persona types. In an embodiment, the apparatus 200 is configured to generate the multi-lingual personalization model based on the maintained record of personalized interaction experiences provided to a plurality of customers. Such a personalization model may serve as reference, linking persona types to methods of personalization such that the apparatus 200 may utilize the personalization model for provisioning personalized interaction experiences to the plurality of customers interacting in the plurality of languages.

In an embodiment, the apparatus 200 is further configured to build targeting models for customers based on both customer profiles (for example, customer types segmented based on gender, income group, demographics and such other criteria) as well as the persona type of the customers. Subsequently, the apparatus 200 is configured to identify the propensity to buy for potential buyers for each persona type, interact proactively with the buyers over an interaction channel and/or offer a personalized experience based on the persona type. Further, the apparatus 200 may be configured to provide recommendations on potential up-sell/cross-sell items based on association mining or market-based analysis for a particular persona.

In an embodiment, the apparatus 200 may include more number of components than those depicted in FIG. 2. In an embodiment, the apparatus 200 additionally includes other components (not shown in FIG. 1), such as, for example, an input unit, a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. In an embodiment, the various components of the apparatus 200 may be implemented as a fully distributed system across different geographic locations. In an alternate embodiment, the apparatus 200 may be embodied as a monolithic centralized platform. In another embodiment, the apparatus 200 may be embodied as a mix of existing open systems, proprietary systems and third party systems. In another embodiment, the apparatus 200 may be implemented completely as a set of software layers on top of existing hardware systems. As explained above, the apparatus 200 is configured to facilitate personalization of customer interaction experiences based on prediction of customer persona type. The provisioning of personalized interaction experience to a customer is further explained with reference to an illustrative example in FIG. 3.

Figure 3:
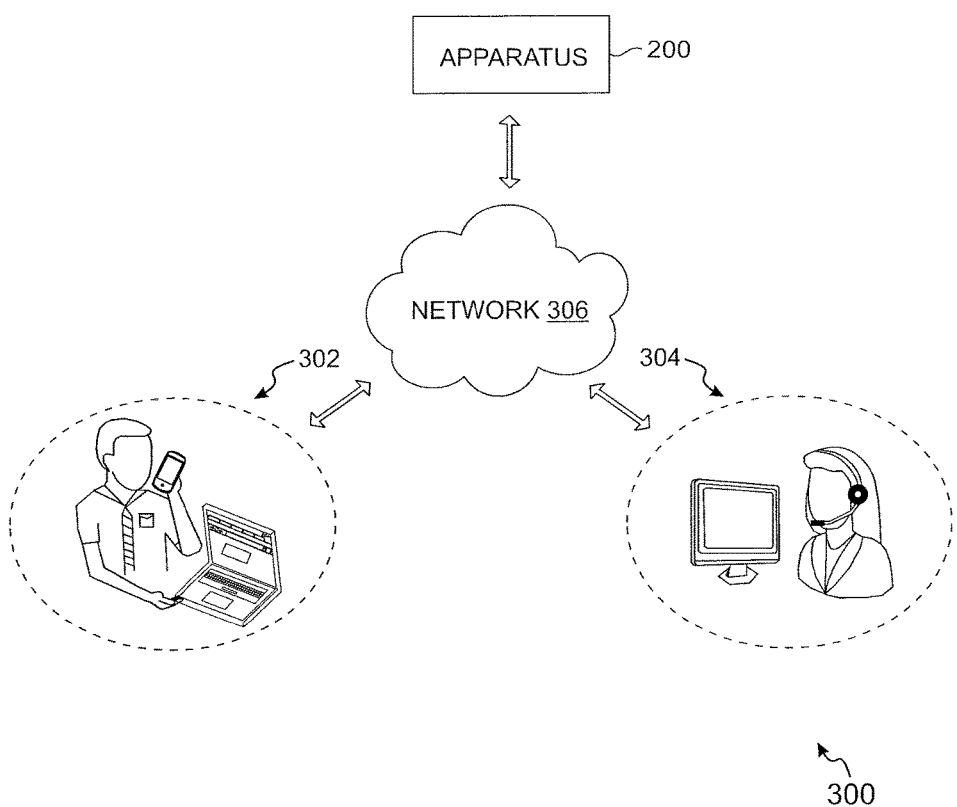
FIG. 3 shows a schematic representation of an exemplary scenario for illustrating a provisioning of personalized interaction experience to a customer by the apparatus of FIG. 2 in accordance with an embodiment of the invention.

Referring now to FIG. 3, a schematic representation 300 of an exemplary scenario is shown for illustrating a provisioning of personalized interaction experience to a customer 302 by the apparatus 200 in accordance with an embodiment of the invention. More specifically, the schematic representation 300 depicts the customer 302 to be engaged in a phone call based interaction with an agent 304 deployed in a remote customer support facility, such as the customer support facility 106 explained with reference to FIG. 1. In an example scenario, the customer 302 may have contacted the agent 304 to complain about a credit card billing issue. The interaction on the speech channel may be enabled over a network 306 which may be similar to the network 120 explained with reference to FIG. 1. Moreover, the schematic representation 300 depicts the apparatus 200 to be connected to the network 306 and further configured to receive the interaction data related to the interaction in an on-going manner. It is understood that the interaction data may, in such a scenario, refer to text-based transcript of voice conversation, which may be generated by converting/transcribing the natural language utterances into textual content. In an embodiment, the natural language utterances may be passed through an automatic speech recognition (ASR) system, which may provide an independent, computer-driven transcription of a spoken language/speech into reliable textual content in real-time. In an automatic transcription by the ASR system, standard language modeling techniques, such as statistical language modeling (SLM) toolkit may be utilized for transcribing data associated with the natural language utterances. In an example embodiment, the apparatus 200 may be configured to use a dictation and/or a large vocabulary grammar, among other resources, to transcribe the natural language utterance into textual content.

As explained with reference to FIG. 2, the apparatus 200 is configured to receive an input corresponding to the business objective and/or the interaction channel. In an example embodiment, the apparatus 200 may be provided with a customer service based objective of containing the erosion of brand reputation on social media. Further, the apparatus 200 may receive an input identifying the interaction channel as the speech channel. For such inputs corresponding to the business objective and the interaction channel, the apparatus 200 is configured to identify a customer classification framework from among the plurality of customer classification frameworks. The identified customer classification framework may be associated with a plurality of persona types as explained with reference to FIG. 2. The apparatus 200 is configured to predict a persona type of the customer 302 from among the plurality of persona types. More specifically, the apparatus 200 may receive interaction data corresponding to the on-going interaction between the customer 302 and the agent 304 and determine behavioral traits corresponding to the customer 302. As explained with reference to FIG. 2, the behavioral traits exhibited or mentioned during the interaction, or inferred during the interaction or even predicted based on past interaction history may be utilized to predict the persona type of the customer 302. In an example scenario, the persona type of the customer 302 may be predicted as 'aggressive customer', i.e. the customer 302 is likely to complain bitterly regarding his/her experience. Upon prediction of such a persona type of the customer 302, the apparatus 200 is further configured to predict a propensity of the customer 302 to perform at least one action. In an example scenario, the customer 302 may be predicted to complain on social media about his billing issue and in general socialize his/her negative opinion regarding the credit card brand.

As explained with reference to FIG. 2, the apparatus 200 may be configured to associate one or more value traits with the persona type predicted for the customer 302. In an example scenario, value traits, such as quick response to the interaction and timely resolution of the issue in addition to confirmation to the customer 302 that his issue is a priority, may be associated with the persona type of the customer 302. Accordingly, the apparatus 200 may be configured to generate one or more recommendations that are configured to accomplish the business objective of containment of brand erosion as well as are suited to satisfy the value traits, such as quick response to the interaction, timely resolution of the issue and confirmation to the customer 302 that his/her issue is a priority. In an embodiment, the recommendations may be provisioned to the agent 304 to provide a personalized interaction experience to the customer 302. Accordingly, in an example scenario, based on the identification of the persona type as an aggressive customer of the customer 302, the apparatus 200 may recommend routing the interaction to an agent suited to handle such persona types. In another example scenario, the agent 304 may suggest escalation of the billing issue to the billing disputes department and seek confirmation of early resolution from the billing disputes department to ensure the customer 302 that his concern is a priority. In an example embodiment, the apparatus 200 may have determined the affinity of the customer 302 to be the web channel. Accordingly, the apparatus 200 may provide a recommendation to the agent 304 to seek the customer's permission to continue the interaction on the web channel and thereafter guide him to place his complaint on the website and in turn receive a complaint reference number that the customer 302 can print and utilize later for reference purposes. It is understood that such recommendations may provide a personalized interaction experience to the customer 302, which may in turn assist in accomplishing the business objective as well suit the value traits associated with the persona type of the customer 302. The provisioning of the personalized interaction experience to a customer is further explained with reference to another illustrative example in FIG. 4.

Figure 4:
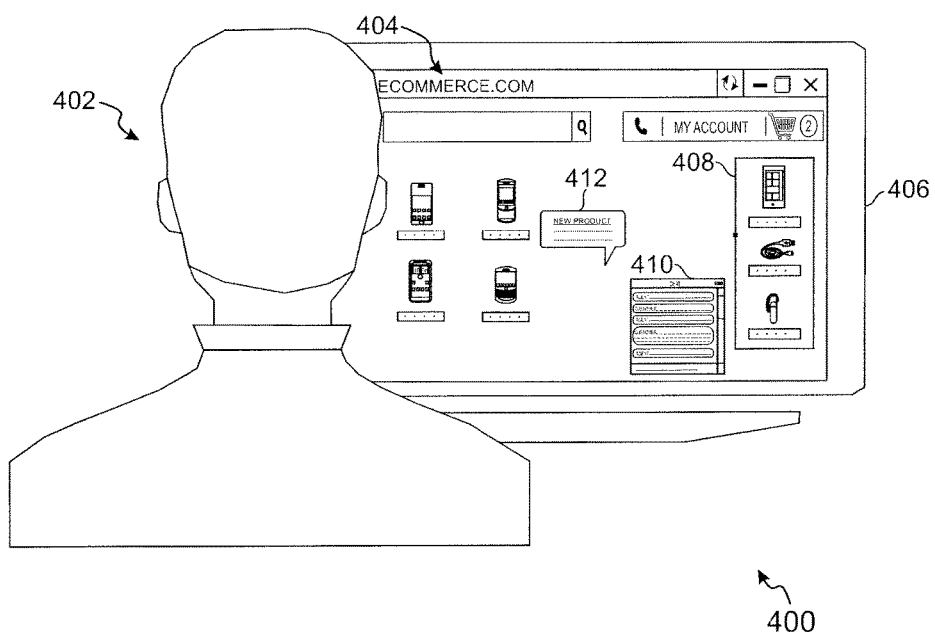
FIG. 4 shows another schematic representation of an exemplary scenario for illustrating a provisioning of personalized interaction experience to a customer by the apparatus of FIG. 2 in accordance with an embodiment of the invention.

Referring now to FIG. 4, a schematic representation 400 of an exemplary scenario is shown for illustrating a provisioning of personalized interaction experience to a customer 402 by the apparatus 200 in accordance with another embodiment of the invention. More specifically, the schematic representation 400 depicts the customer 402 accessing an e-commerce portal 404 on an electronic device 406 (exemplarily depicted to be a desktop computer) associated with the customer 402. It is understood that such an interaction on the web channel may be enabled over a network, such as the network 120 explained with reference to FIG. 1. Moreover, the apparatus 200 may be connected to the network (not shown in FIG. 4) and configured to receive the interaction data related to the customer activity on the e-commerce portal 404 (such as for example, web pages visited, images accessed, etc.) in an on-going manner.

As explained with reference to FIG. 2, the apparatus 200 is configured to receive an input corresponding to the business objective and/or the interaction channel. In an example embodiment, the apparatus 200 may be provided with a customer sales based objective of increasing sales revenue. Further, the apparatus 200 may receive an input identifying the interaction channel as the web channel. For such inputs corresponding to the business objective and the interaction channel, the apparatus 200 is configured to identify a customer classification framework from among the plurality of customer classification frameworks. The identified customer classification framework may be associated with a plurality of persona types as explained with reference to FIG. 2. The apparatus 200 is configured to predict a persona type of the customer 402 from among the plurality of persona types. More specifically, the apparatus 200 may receive interaction data corresponding to the on-going customer activity of the customer 402 on the e-commerce portal 404 and determine behavioral traits corresponding to the customer 402. In an example scenario, the persona type of the customer 402 may be predicted as 'compulsive buyer', i.e. the customer 402 is likely to buy products he/she might not have a need for. Upon prediction of such a persona type of the customer 402, the apparatus 200 is further configured to predict a propensity of the customer 402 to perform at least one action based on the persona type. In an example scenario, the customer 402 may be predicted to spend a large amount of time on the e-commerce portal 404 looking for whole range of offered products. In an embodiment, the apparatus 200 may be configured to associate one or more value traits with the persona type predicted for the customer 402. In an example scenario, value traits, such as fashionable, leisure (i.e. having time on hand to hear/read features of a product), diversity (i.e. seeking variety in products purchased) may be associated with the persona type of the customer 402.

Accordingly, the apparatus 200 may be configured to generate one or more recommendations that are configured to accomplish the business objective of increasing sales revenue as well as suited to satisfy the value traits, such as fashionable, leisure and diversity. In an embodiment, a chat agent (not shown in FIG. 4) may be requested to proactively seek chat interaction with the customer 402. Moreover, one or more recommendations may be provisioned by the apparatus 200 directly to the customer 402 or to the chat agent for facilitating a provisioning of personalized interaction experience to the customer 402. Accordingly, in an example scenario, based on the identification of the persona type to be a compulsive buyer for the customer 402, the apparatus 200 may recommend the chat agent to offer up-sell, i.e. recommend more expensive line of products in the category which the customer 402 is currently viewing, or cross-sell, i.e. recommend related products to the category which the customer 402 is currently viewing, options to the customer 402 as depicted by phone model ranges and accessories displayed in widget 408 the display screen of the electronic device 406. Further, the chat agent may also explain various features of products being viewed to the customer 402 during the chat interaction as exemplarily depicted by the chat client 410 on the display screen of the electronic device. Furthermore, the apparatus 200 may also be configured to display pop-ups, such as the pop-up 412 including information on new product releases to the customer 402. It is understood that such recommendations may provide a personalized interaction experience to the customer 402, which may in turn assist in accomplishing the business objective as well suit the value traits associated with the persona type of the customer 402. A method for personalizing customer interaction experiences is explained with reference to FIG. 5.

Figure 5:
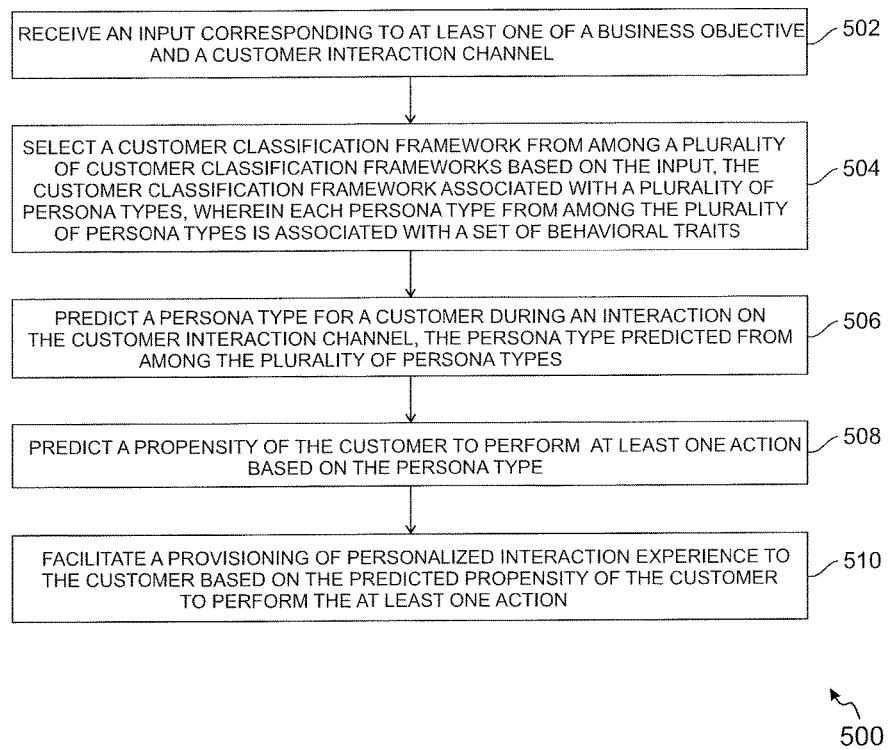
FIG. 5 illustrates a flow diagram of an example method for personalizing customer interaction experiences in accordance with an embodiment of the invention.

FIG. 5 illustrates a flow diagram of an example method 500 for personalizing customer interaction experiences in accordance with an example embodiment of the invention. The method 500 depicted in the flow diagram may be executed by, for example, the apparatus 200 explained with reference to FIGS. 2 to 4. Operations of the flow diagram, and combinations of operation in the flow diagram, may be implemented by, for example, hardware, firmware, a processor, circuitry and/or a different device associated with the execution of software that includes one or more computer program instructions. The operations of the method 500 are described herein with help of the apparatus 200. For example, one or more operations corresponding to the method 500 are explained herein to be executed by a processor, such as the processor 202 of the apparatus 200. It is noted that though the one or more operations are explained herein to be executed by the processor alone, it is understood that the processor is associated with a memory, such as the memory 204 of the apparatus 200, which is configured to store machine executable instructions for facilitating the execution of the one or more operations. It is also noted that, the operations of the method 500 can be described and/or practiced by using an apparatus other than the apparatus 200. The method 500 starts at operation 502.

At operation 502, an input corresponding to at least one of a business objective and a customer interaction channel is received by a processor (such as for example, the processor 202 of the apparatus 200). An example of a business objective in a customer service scenario may be to achieve higher level of customer satisfaction, to reduce operational cost, to quickly resolve customer queries and the like. In another illustrative example, a business objective in a customer sales scenario may be to drive higher revenue, higher conversion volumes and the like. Further, the interaction channel in the received input may correspond to a medium of on-going customer interaction or an interaction channel predicted to be selected by the customer in near future for interaction purposes, or, even an interaction channel determined to be most appropriate for proactively reaching out to the customer.

At operation 504, a customer classification framework is selected from among a plurality of customer classification frameworks based on the input by the processor. More specifically, the customer classification framework is selected based on the input corresponding to the at least one of the business objective and the interaction channel. As explained with reference to FIG. 2, a number of customer classification frameworks or taxonomies may be identified based on review of literature, such as for example behavioral studies, surveys and the like. The identified customer classification frameworks may be capable of facilitating segregating customers based on customer personas types. Further, the customer classification framework is associated with a plurality of persona types, where each persona type from among the plurality of persona types is associated with a set of behavioral traits. For example, a behavioral trait from among the set of behavioral traits corresponds to one of a customer biological characteristic, a customer sociological characteristic and a customer psychological characteristic. The selection of the appropriate customer classification framework, examples of persona types associated with customer classification frameworks as well as examples of biological/sociological/psychological characteristics configuring the set of behavioral traits in persona types are explained with reference to FIG. 2 and are not discussed again herein.

At operation 506, a persona type from among the plurality of persona types is predicted for a customer during an interaction on the customer interaction channel by the processor. As explained in FIG. 2, the persona type may be predicted based on behavioral traits exhibited or mentioned by the customer during the interaction or behavioral traits inferred during the interaction. In some example embodiments, the persona type is predicted based on past interaction history associated with the customer, where the past interaction history is indicative of behavioral traits corresponding to the customer. The behavioral traits exhibited, mentioned, inferred or predicted based on past interaction history may be compared with sets of behavioral traits associated with the plurality of persona types in the identified customer classification framework to identify a presence of a match. The matching persona type may be predicted as the persona type of the customer.

At 508, a propensity of the customer to perform at least one action is predicted based on the persona type by the processor. In an embodiment, the propensity to perform the at least one action is predicted based on the persona type as well as the information stored corresponding to the customer. In an embodiment, the propensity of the customer to perform the at least one action corresponds to at least one of propensity to purchase a product, the propensity to interact with a customer support representative over one or more interaction channels and the like. As explained in FIG. 2, prediction models such as models based on supervised or unsupervised algorithms may be utilized for predicting propensity of the customer to perform at least one such action.

At operation 510, a provisioning of personalized interaction experience to the customer is facilitated based on the predicted propensity of the customer to perform the at least one action by the processor. As explained in FIG. 2, in order to facilitate the provisioning of the personalized interaction experience to the customer, one or more value traits are associated with the persona type predicted for the customer. As explained with reference to FIG. 2, each value trait from among the one or more value traits corresponds to an attribute characterizing a nature of the interaction, where the attribute is deemed to be of value (for example, of importance or liking) to the persona type. The one or more value traits may be collated from surveys, behavioral studies, design of experiments, explicitly mentioned by customers in their interactions, inferred or predicted from interaction history and the like.

In an embodiment, one or more recommendations are generated by the processor based on the predicted propensity to perform the at least one action for facilitating the provisioning of the personalized interaction experience to the customer. In an embodiment, the one or more recommendations are generated such that the business objective is achieved during the interaction and/or recommendations are suited to satisfy the one or more value traits associated with the persona type. The generation of such recommendations may be performed as explained with reference to FIGS. 3 and 4 and are not explained herein.

In an embodiment, an affinity of the persona type to one or more interaction channels is identified and an on-going interaction is routed to the one or more interaction channels if the interaction channel associated with the current interaction is determined to be not among the one or more interaction channels. Similarly, agent persona types are predicted for a plurality of agents and an agent from among the plurality of agents with an agent persona type most suitable for conducting the interaction with the customer associated with the predicted persona type is identified. The interaction is then routed to the agent with the matching persona type to provision the personalized interaction experience to the customer.

In an embodiment, a self-selection option may be provisioned to at least one of the customer and the agent for selecting one or more persona types from among the plurality of persona types. Based on the selected persona type by the customer and/or the agent, the propensity to perform at least one action during an interaction may be predicted and accordingly a provisioning of the personalized interaction experience to the customer may be facilitated as explained in FIG. 2. In an embodiment, a learning of prediction models associated with predicting the persona type of the customer or the agent is facilitated based on the self-selection.

In an embodiment, the most appropriate method of personalization is predicted based on data driven approaches such as, modeling or performing design of experiments. As explained with reference to FIG. 2, some examples of such methods of personalization may include but are not limited to sending a self serve link, sharing a knowledge base article, providing resolution to customer query over an appropriate interaction channel, escalation or suggestion of escalation of customer service level and the like. In an embodiment, design of experiments may be carried out on the selection of appropriate interaction channel, the framework of persona types, selection of best channel of interaction, the format and content of personalization, presentation of personalization to the agent or the customer and the like.

In an embodiment, a confidence level associated with the prediction of the persona type of the customer is determined by the processor and a degree of personalization related to the personalized interaction experience to be provided to the customer is adapted based on the determination of the confidence level. More specifically, as explained in FIG. 2, certain personalization features may be switched on or off based on the confidence level associated with the prediction of the persona type of the customer. The degree of personalized interaction experience may be adapted based on the confidence level as explained with reference to FIG. 2 and is not explained herein for sake of brevity.

In an embodiment, a personalization model may be generated and maintained by the processor for customer interactions associated with a first language. A record of personalized interaction experiences provided to a plurality of customers may be maintained, and, based on the maintained record of personalized interaction experiences, the personalization model may be generated. The personalization model may serve as reference, linking persona types to methods of personalization such that the personalization model may be utilized for provisioning personalized interaction experiences to plurality of customers interacting in say, English language. In an embodiment, personalized interaction experiences are provisioned to one or more customers interacting in a second language based on the personalization model. For example, a personalization model is generated and maintained based on English language, i.e. first language, then in some example scenarios, the personalized interaction experiences may be provided to customers interacting in say, German language, i.e. second language, based on the personalization model. Similarly, a multi-lingual personalization model may be generated and maintained by the processor for personalizing customer interactions across a plurality of languages, as explained in FIG. 2. In another embodiment, targeting models may be built for customers based on customer profiles as well as the persona type of the customers as explained in FIG. 2.

Without in any way limiting the scope, interpretation, or application of the claims appearing below, advantages of one or more of the exemplary embodiments disclosed herein include personalizing customer interaction experiences. Various embodiments disclosed herein provide numerous advantages. The methods and apparatuses disclosed herein suggest segmenting a customer base based on key behavioral traits or personas (or persona types) to identify groups that behave similarly and to personalize treatment to these groups during interactions over various interaction channels. As explained above, inclusion of customer behavioral attributes facilitates enabling provision of high quality personalized treatment to a customer. Moreover, the techniques suggested herein enable identification of the persona type of a customer over one interaction channel and provision personalized interaction experience over selected or all other interaction channels based on the predicted or mentioned persona type. Also, the methods and apparatuses are configured to use a persona based personalization model based on a population of customers interacting in one language, and use the same model for customers interacting in a different language. The methods and apparatuses are also configured to facilitate building a generic customizable persona based multi-language model or language agnostic model that may be used for personalization of interactions across various languages. An example of language agnostic model might be one that predicts persona type based on numerical data only or on numeric data and translated text. The method of personalization identified from such language agnostic model may further be used for language specific personalization. The present invention may further be configured to allow for prioritization of personalization to selected persona types based on the modeled or anticipated impact on business metric, such as revenue, conversions, customer satisfaction, etc. and/or confidence of prediction.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202 and the memory 204 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIG. 5). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations which are different than those which are disclosed. Therefore, although the invention has been described based upon these exemplary embodiments, it is noted that certain modifications, variations, and alternative constructions may be apparent and well within the spirit and scope of the invention. Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for personalizing customer interaction experiences on customer interaction channels by routing interactions, the method comprising:

receiving, by a processor, an input corresponding to at least one of a business objective and a customer interaction channel;

selecting, by the processor, a customer classification framework from among a plurality of customer classification frameworks based on the input, the customer classification framework associated with a plurality of persona types, wherein each persona type from among the plurality of persona types is associated with a set of behavioral traits, wherein a behavioral trait from among the set of behavioral traits corresponds to one of a customer biological characteristic, a customer sociological characteristic, and a customer psychological characteristic;

predicting, by the processor, a persona type for a customer during an interaction on the customer interaction channel, the persona type predicted from among the plurality of persona types, wherein the persona type is predicted from among the plurality of persona types based on behavioral traits exhibited by the customer during the interaction;

predicting, by the processor, a propensity of the customer to perform at least one action based on the persona type;

determining, by the processor, a confidence level associated with the prediction of the persona type of the customer;

facilitating, by the processor, a provisioning of personalized interaction experience to the customer based on the predicted propensity of the customer to perform the at least one action;

adapting, by the processor, a degree of personalization related to the personalized interaction experience to be provided to the customer based on the determination of the confidence level;

identifying, by the processor, an affinity of the persona type to one or more customer interaction channels from among a plurality of customer interaction channels;

determining, by the processor, if the customer interaction channel associated with the interaction is one among the one or more customer interaction channels; and routing the interaction, by the processor, to the one or more customer interaction channels if the customer interaction channel associated with the interaction is determined to be not among the one or more customer interaction channels, wherein the routing of the interaction to the one or more customer interaction channels is performed to provision the personalized interaction experience to the customer.

2. The method of claim 1, wherein the persona type is predicted from among the plurality of persona types based on behavioral traits mentioned by the customer during the interaction or behavioral traits inferred during the interaction.

3. The method of claim 1, wherein the persona type is predicted from among the plurality of persona types based on past interaction history associated with the customer, the past interaction history indicative of behavioral traits corresponding to the customer.

4. The method of claim 1, wherein an action from among the at least one action corresponds to one of purchasing a product, interacting with an agent over one or more customer interaction channels, and socializing at least one of a product, a purchase, a good sentiment, a bad sentiment, a brand, an experience and a feeling.

5. The method of claim 1, wherein the interaction corresponds to one of a voice-based interaction and a chat-based interaction between the customer and an agent, and, wherein the interaction is initiated by the customer or proactively initiated by the agent.

6. The method of claim 5, further comprising:
associating, by the processor, one or more value traits with the persona type, wherein each value trait from among the one or more value traits corresponds to an attribute characterizing a nature of the interaction, the attribute deemed to be of value to the persona type.

7. The method of claim 6, further comprising:
generating, by the processor, one or more recommendations based on the predicted propensity to perform the at least one action for facilitating the provisioning of the personalized interaction experience to the customer, wherein the one or more recommendations are generated to achieve at least one of an accomplishment of the business objective during the interaction and a satisfaction of the one or more value traits associated with the persona type.

8. The method of claim 7, wherein the one or more recommendations are provided to the customer or to the agent during the interaction for facilitating the provisioning of the personalized interaction experience to the customer.

9. The method of claim 5, further comprising:
provisioning, by the processor, a self-selection option to at least one of the customer and the agent for selecting one or more persona types from among the plurality of persona types; and
facilitating, by the processor, a learning of prediction models associated with predicting the persona type of the customer or the agent based on the selection of the self-selection option.

10. The method of claim 1, further comprising:
predicting, by the processor, agent persona types for a plurality of agents, the agent persona types predicted from among the plurality of persona types;
identifying, by the processor, an agent from among the plurality of agents, the agent associated with an agent persona type most suitable for conducting the interaction with the customer associated with the predicted persona type; and
routing, by the processor, the interaction to the agent to provision the personalized interaction experience to the customer.

11. The method of claim 1, further comprising:
generating and maintaining, by the processor, a personalization model for customer interactions associated with a first language, the personalization model generated and maintained based on provisioning of personalized interaction experiences to a plurality of customers based on prediction of persona types for the plurality of customers; and
provisioning, by the processor, personalized interaction experiences to one or more customers interacting in a second language based on the personalization model.

12. The method of claim 1, further comprising:
generating and maintaining, by the processor, a multi-lingual personalization model for personalizing customer interactions across a plurality of languages, the multi-lingual personalization model generated and maintained based on provisioning of personalized interaction experiences to a plurality of customers based on prediction of persona types for the plurality of customers.

* * * * *